June 25, 1968  R. I. SATTLER  3,389,454

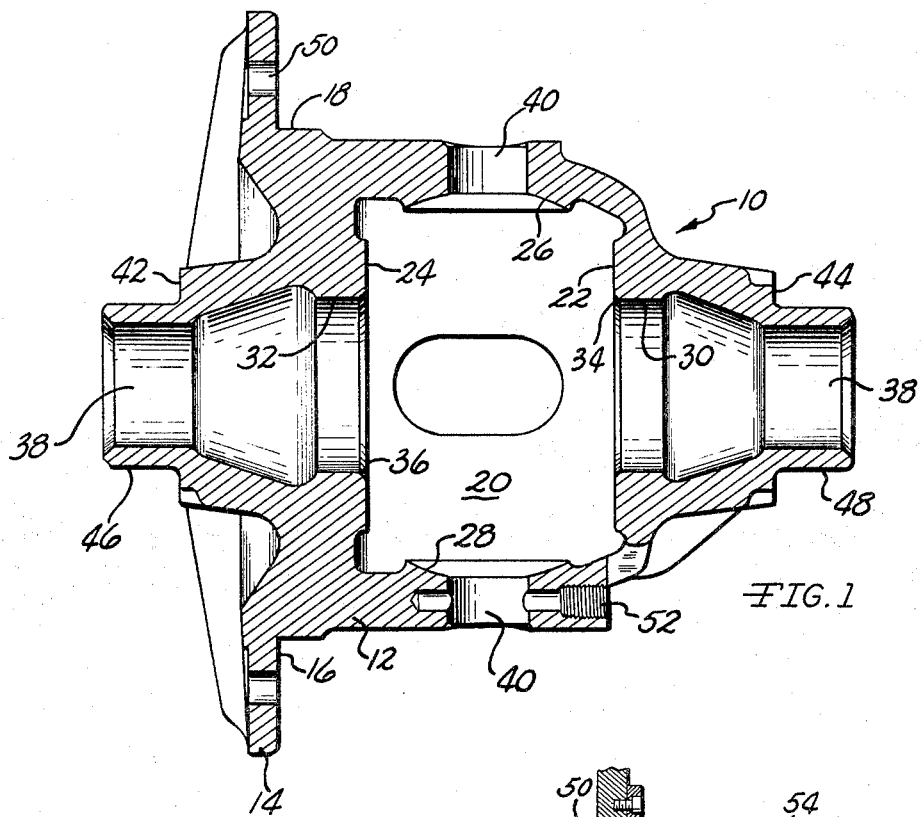

METHOD OF MACHINING A GEAR CASE

Filed June 27, 1966  3 Sheets-Sheet 3

INVENTOR
ROBERT I. SATTLER

BY *Olsen and Stephenson*
ATTORNEYS

United States Patent Office 3,389,454
Patented June 25, 1968

3,389,454
METHOD OF MACHINING A GEAR CASE
Robert I. Sattler, St. Clair Shores, Mich., assignor to La Salle Machine Tool, Inc., Warren, Mich., a corporation of Michigan
Continuation-in-part of application Ser. No. 356,794, Apr. 2, 1964. This application June 27, 1966, Ser. No. 560,668
4 Claims. (Cl. 29—406)

This invention relates generally to methods for machining metal parts and more particularly to an improved method of machining a differential gear case. This application is a continuation-in-part of copending application Ser. No. 356,794 filed Apr. 2, 1964, now abandoned.

A differential gear case functions as a support for a ring gear, side gears, and a pinion gear in a vehicle drive assembly. The various faces and seats in the case which determine the locations of the gears must therefore be accurately positioned in order to insure the necessary relative locations of the gears to provide proper operation of the drive assembly. Heretofore, the usual practice has been to locate all of the faces and seats from the ring gear flange face. This has resulted in tolerance buildups that in turn resulted in unsatisfactory cases and has unduly restricted automation machinery to use with gear cases having the ring gear flange located in the same place. It is an object of this invention therefore to provide an improved method of machining a gear case which provides for maintained accuracy in the location of the gear case faces and seats which are required to be accurately located for proper gear assembly therein.

In the method of this invention, one of the side gear thrust faces is first located and machined relative to the gear case bearing shoulder which, in the use of the gear case, determines the proper position of the case. At the same time the side gear bearing pocket in the machined face is bored and chamfered. The opposite side gear thrust face is then machined and located relative to the first thrust face, and the other side gear bearing pocket is bored and chamfered. Following this operation the cross pin hole is bored at a location equal distances between the thrust faces. The spherical seats for the pinion gears are then machined so that they are concentric with the cross pin hole and spaced equal distances from the axis of the side gear bearing pockets. As a result when the gear case is used in a drive assembly it will function to support and properly locate all of the gears associated with it.

Further objects, features and advantages of this invention will become apparent from a consideration of the following description, the appended claims, and the accompanying drawing in which:

FIGURE 1 is a sectional view of a differential gear case which is to be machined according to the method of this invention;

FIGURE 2 is a sectional view of the gear case of FIG. 1 illustrating some of the initial steps in the method of this invention;

FIGURES 3–8 are sectional views like FIG. 2 illustrating subsequent steps involved in the machining of a gear case according to this invention.

Figure 4:
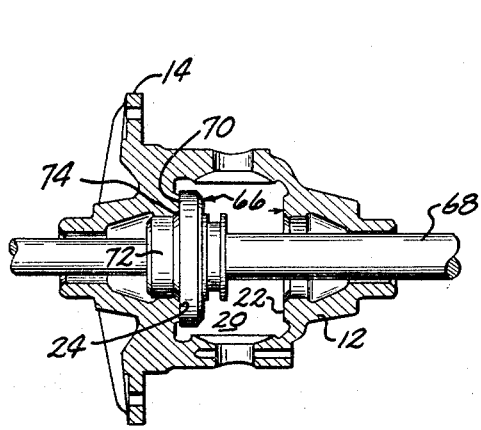

With reference to the drawing, a differential gear case to be finish machined according to the method of this invention is indicated generally at 10 in FIG. 1. The case 10 consists of a body 12 provided with a ring gear flange 14 having a face 16 disposed radially outwardly of an annular ring gear pilot surface 18. The body 12 has an internal cavity 20 bounded on two sides by parallel side gear thrust faces 22 and 24, and bounded on another pair of sides by a pair of spherical seats 26 and 28 for pinion gears. A bearing pocket 30 is formed in the thrust face 22 and a similar bearing pocket 32 is formed in the thrust face 24. The opening which forms the pocket 30 is provided with a chamber 34 at its juncture with the face 22, and the pocket 32 is similarly formed with an inner end chamber 36. The side gear bearing pockets 30 and 32 are coaxial and concentric with an axle shaft opening 38 which extends completely through the body 12 in a direction perpendicular to the opening 38 and is concentric with the spherical seats 26 and 28.

In the method of this invention, a rough gear case 10 is moved through a series of work stations to progressively finish the faces 22 and 24 and the seats 26 and 28 to provide for a final predetermined relationship of these surfaces within very close tolerances. During such movement, the gear case bearing shoulders 42 and 44 and the corresponding bearing hubs 46 and 48, respectively, are sometimes utilized for locating purposes.

As shown in FIG. 2, the initial steps in the finishing of the gear case 10 consist in drilling ring gear flange holes 50 and drilling and tapping a lock pin hole 52. The initial steps can also involve reaming of the ring gear holes 50, spot facing of the holes 50, and probing and blowout of the holes, but these steps are not significant in the practice of the present invention and are therefore not described in detail herein. As shown in FIG. 2, the case 10 is located and clamped at the shoulders 42 and 44 and the hubs 46 and 48, the small arrows pointing to these surfaces being used hereinafter to indicate the portion of the case 10 which is clamped and located. Following clamping and locating of the case 10, a drill 54 is utilized to drill the ring gear holes 50 and a drill 56 is used to drill the lock pin hole 52.

Following formation of the holes 50 and 52, the gear case 10 is moved to a subsequent station at which it is clamped at the shoulders 42 and 44 and the hubs 46 and 48 and a cutter tool 58 is positioned in the cavity 20 and connected to a drive shaft 59. The cutter tool 58 has a working face 60 which is operable to rough finish the side gear thrust face 22 and locate the face 22 a predetermined distance from the bearing shoulder 42. At the same time, a portion 62 of the tool 58 bores the bearing pocket 30 and a portion 64 of the tool 58 machines the chamber 34 at the inner end of the pocket. At the next station, indicated in FIG. 4, a cutting tool 66, like the tool 58, is positioned in the cavity 20 and is driven by a drive shaft 68. The tool 66 has a first portion 70 which is operable to rough finish the side gear thrust face 24 and locate the face 24 a predetermined distance from the other thrust face 22. The tool 66 has a second portion 72 which operates concurrently to bore the bearing pocket 32, and a third portion 74 which operates at the same time to machine the chamfer 36 at the inner end of the pocket.

At a subsequent station (FIG. 5), the tool 58 is utilized, like it is utilized in FIG. 3, to final finish the thrust face 22. The tool 66 is then utilized, as shown in FIG. 6, to final finish the thrust face 24 and locate it directly a predetermined distance from the face 22. The thrust faces 22 and 24 are now in a final finish form and are located, within close tolerances, a predetermined distance apart. Subsequently, and as shown in FIG. 7, drills 76 are utilized to drill the cross pin hole 40, and the drills 76 are located relative to the thrust faces 22 and 24 so as to be spaced equal distances therefrom. The arrows 80 in FIG. 7 diagrammatically represent this equalized location. At a subsequent station, a cutting tool 82 having spherical cutting faces 84 is positioned in the gear case cavity 20 and supported on drive shafts 86 extended into the cavity 20 through the cross pin hole 40. The tool 82 is located on the cross pin hole 40 so that the spherical cutting surfaces 84 are concentric therewith.

Figure 5:
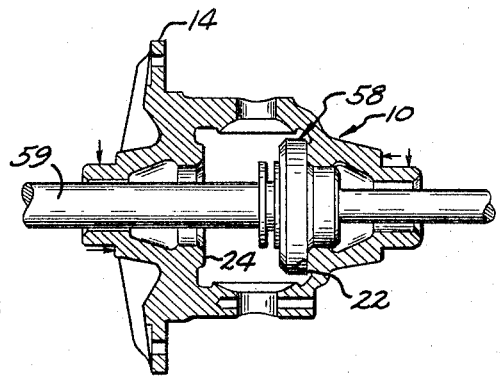
Figure 6:
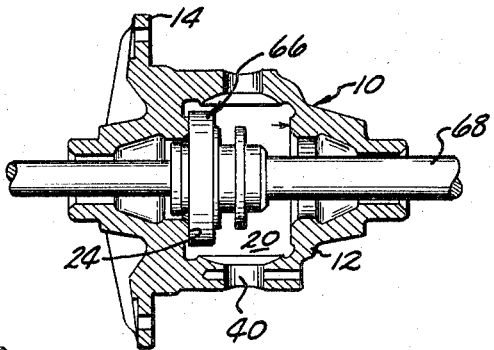
Figure 7:
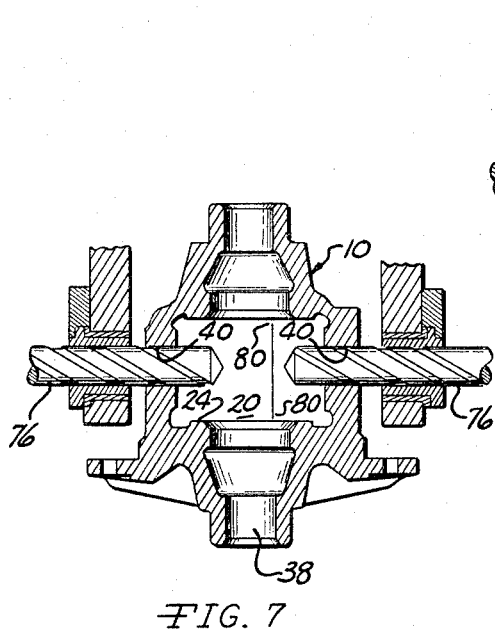
Figure 8:
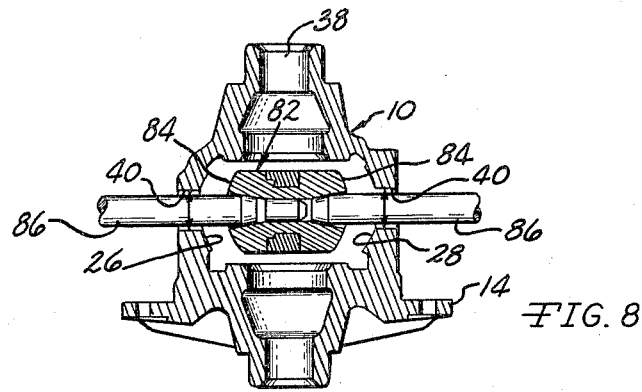

The tool 82 is centered with respect to the axis of the bored bearing pockets 30 and 32, which were final finished in the operations illustrated in FIGS. 5 and 6, and the tool 82 is reciprocated back and forth equal distances on opposite sides of this axis to finish the spherical seats 26 and 28. As a result, the seats 26 and 28 are located equal distances from this axis and are concentric with the cross pin hole 40.

The net result of this series of steps is a finished gear case 10 in which the side gear thrust faces 22 and 24 are precisely located relative to each other and relative to the bearing shoulder 42. Similarly, the spherical seats 26 and 28 are precisely located relative to each other and relative to the thrust faces 22 and 24.

Figure 9:
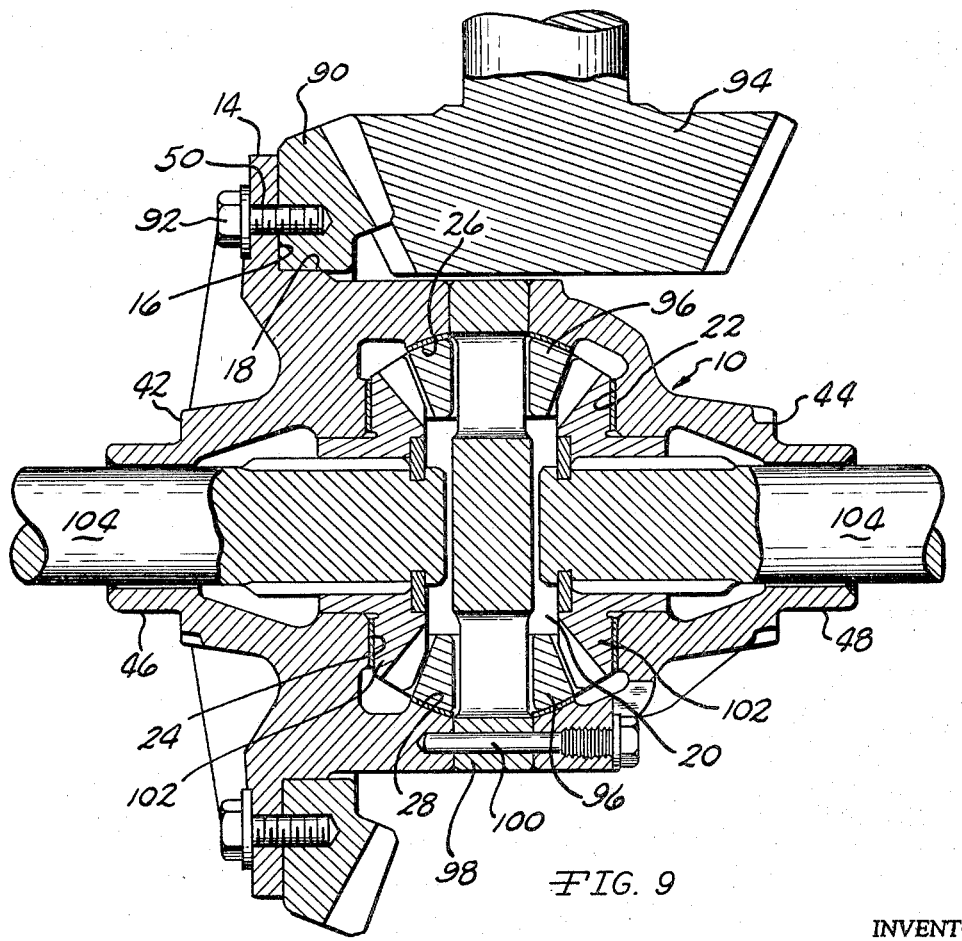
FIGURE 9 is a sectional view of a gear case machined according to the method of this invention, showing the assembly therewith of the gears in a drive assembly.

The importance of this location of the thrust faces and spherical seats is best appreciated from a consideration of FIG. 9 which shows a finished gear case 10 assembled in a drive assembly for a vehicle. This assembly includes a ring gear 90 mounted on the gear case pilot surface 18 against the ring gear face 16 and secured thereto by bolts 92 extending through the ring gear flange holes 50. The ring gear 90 meshes with a drive gear 94 in the usual manner.

The case 10 is mounted on bearings (not shown) which abut the bearing shoulders 42 and 44 and encircle the bearing hubs 46 and 48. Pinion gears 96 are mounted on a cross pin 98 disposed in the cross pin hole 40 and secured therein by a lock pin 100 extended into the opening 52. Side gears 102 are rotatably supported in the bearing pockets 30 and 32 so that they abut the thrust faces 24 and 22 and mesh with the pinion gears 96. Axle shafts 104 are spline connected to the side gears 102 and extend through the axle shaft opening 38 in the gear case 10. It is thus apparent from FIG. 9 that the location of the thrust faces 22 and 24 and the spherical seats 26 and 28 according to the method of this invention insures the proper location of the pinion gears 96 and the side gears 102 in a differential gear mechanism. Furthermore, by virtue of the method of this invention, gear cases having ring gear flanges 14 located in different positions are readily machined on the same automated line of machine tools. It can thus be seen that this invention provides an improved method of machining ring gear cases which is versatile and accurate in use.

It will be understood that the method of machining a gear case which is herein disclosed and described is presented for purposes of explanation and illustration and is not intended to indicate limits of the invention, the scope of which is defined by the following claims.

What is claimed is:
1. The method of machining a gear case having an internal cavity, an external bearing shoulder, side gear thrust faces on a first pair of opposite sides of said cavity substantially parallel to said shoulder, and pinion gear spherical seats on a second pair of opposite sides of said cavity, said method comprising the steps of:
 (a) machining one of said thrust faces so that it is located a predetermined distance from said bearing shoulder;
 (b) machining the other one of said thrust faces so that it is located directly a predetermined distance from said one thrust face;
 (c) drilling a hole through said case so that said hole is parallel to and is disposed equal distances between said thrust faces; and
 (d) machining said spherical seats so that they are concentric with said hole and are a predetermined distance from each other.

2. The method according to claim 1 further including the steps of:
 (a) boring a side gear bearing pocket in each of said faces concurrently with the machining of said faces so that said pockets are in axial alignment.

3. The method according to claim 2 in which said spherical seats are located relative to the axis of said pockets so that said seats are located equal distances on opposite sides of said axis.

4. The method according to claim 2 in which each of said pockets is chamfered at its juncture with the face in which it is bored concurrently with the boring of said pocket.

References Cited
UNITED STATES PATENTS

| | | | |
|---|---|---|---|
| 2,120,966 | 6/1938 | Clark | 29—33 |
| 2,147,243 | 2/1939 | Cornell | 29—157.1 |
| 2,277,084 | 3/1942 | Drissner | 29—159.2 |
| 2,277,613 | 3/1942 | Swenson | 29—406 |
| 2,548,546 | 1/1951 | Wildhaber | 29—558 |

THOMAS H. EAGER, *Primary Examiner.*